July 7, 1936.  E. K. BAKER  2,046,602
MOTOR VEHICLE
Filed April 29, 1933
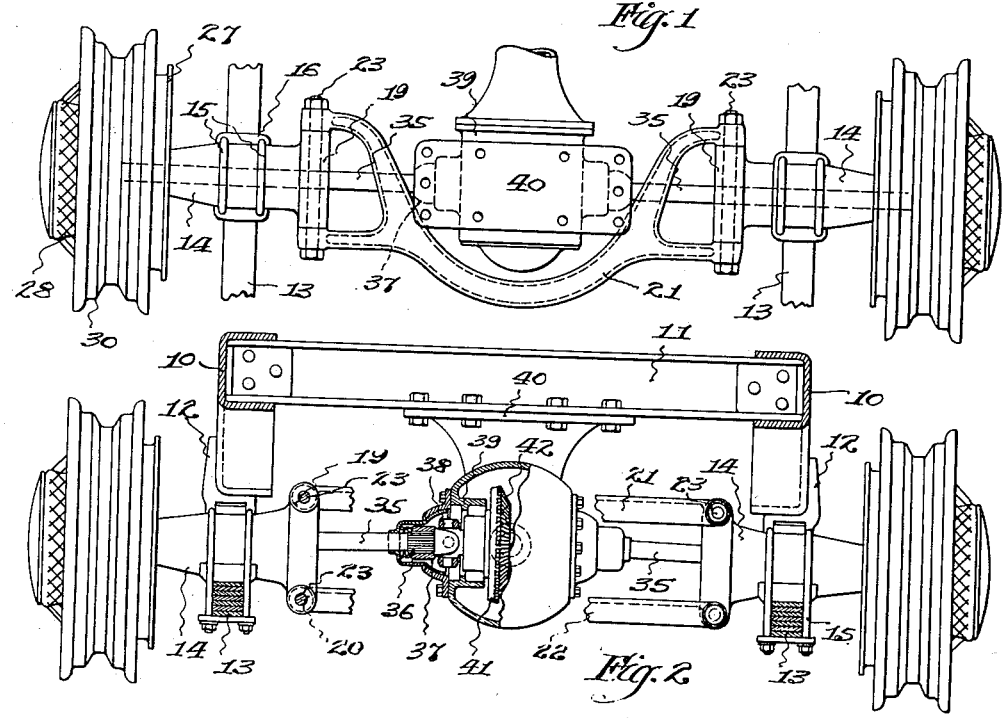
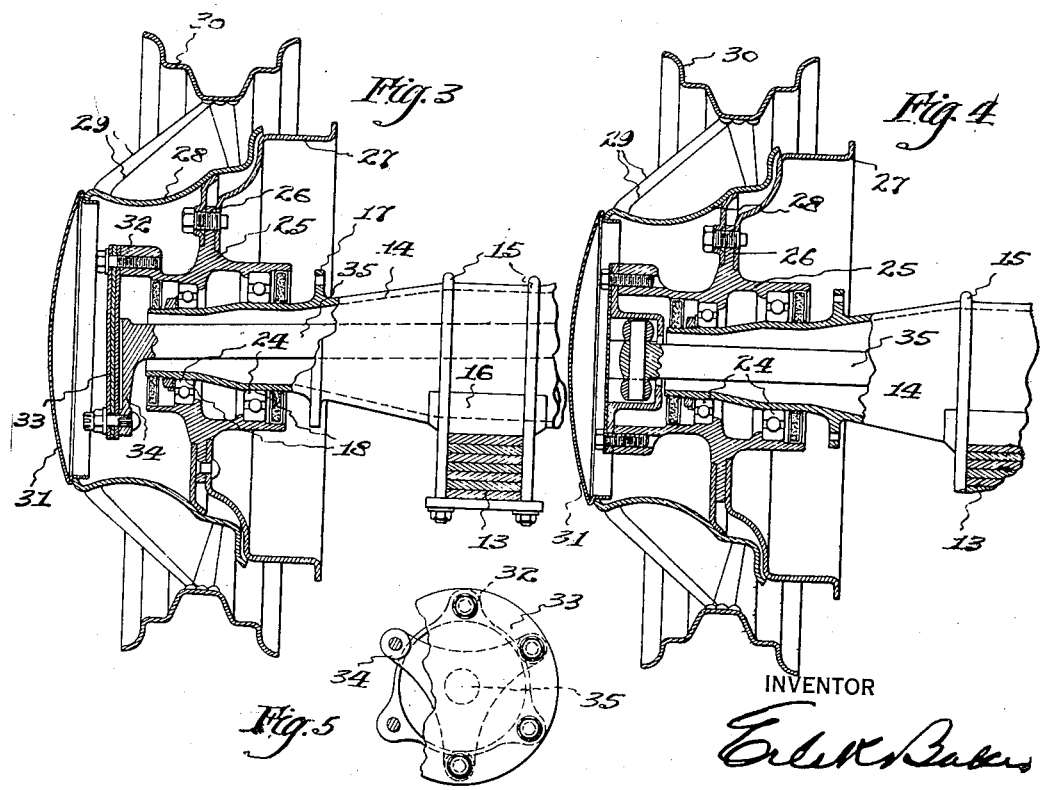
INVENTOR
E. K. Baker Patented July 7, 1936

2,046,602

UNITED STATES PATENT OFFICE 2,046,602

MOTOR VEHICLE

Erle K. Baker, Detroit, Mich., assignor to Baker Axle Company, Cleveland, Ohio, a corporation of Ohio Application April 29, 1933, Serial No. 668,534

7 Claims. (Cl. 180—73)

This invention relates to improvements in motor vehicles and more particularly the driving axle therefor, as described in the present specification and more particularly set forth in the appended claims that form part of the same.

The invention consists essentially in the novel arrangement and construction of parts whereby chassis supporting drive wheels are mounted on hollow axle sections through which drive shafts extend and are connected to the wheels at their outer ends and at their inner ends to a transmission mechanism mounted on the chassis frame.

The objects of the invention are to materially simplify the driving wheel connections of a motor vehicle driving axle having a power transmission mechanism mounted on the chassis frame by reducing the number of parts and consequent cost, thereby minimizing maintenance problems, such as replacement of parts and lubrication.

Further objects and advantages will be apparent from the drawing as more fully described in the following specification accompanying the same.

In the drawing Fig. 1 is a plan view of the motor vehicle driving axle and wheels with the tires removed.

Fig. 2 is a rear elevation of the axle, partly in section and partly broken away, to show the center transmission connections to the chassis frame.

Fig. 3 is an enlarged vertical sectional view of the axle connections to the left side wheel as shown in Figs. 1 and 2.

Fig. 4 is a view similar to Fig. 3 showing a modified axle connection to the wheel.

Fig. 5 is a detail end elevation view of the universal connection between the axle shaft and wheel hub.

The present invention constitutes an improvement on the motor vehicle axle constructions, shown in my pending application Serial No. 650,546, filed January 6, 1933, and this application is a continuation in part of that application.

In the drawing like numerals of reference in the several figures refer to similar parts.

Referring to the drawing and more especially Figs. 1 to 3 inclusive, 10 are the side members of a vehicle chassis frame having a rear cross member 11 secured therebetween. The side frame members 10 are shown with the spring brackets 12 secured thereto and pivotally connected by any conventional means with the multiple leaf semi-elliptic springs 13, though it must be understood the particular type and form of springs and their manner of connection with the vehicle frame do not form a particular part of this present invention.

The springs 13 are shown attached to the underside of the axle housing sections 14, by the U bolts 15, in what is commonly termed an "underslung" construction, said axle housing sections 14 being substantially frusto-conical in shape and provided with the spring pads 16; the brake back plate flange 17; the bearing seats 18 adjacent their outer ends, to provide a "full floating" wheel mounting as hereinafter more particular described, and each having upper and lower horizontal hinge knuckles 19 and 20 respectively, at their innermost extremities.

The hinge knuckles 19 and 20 of the axle housing sections 14 are hingedly connected to the upper and lower parallel yoke bars 21 and 22 by the hinge bolts 23 thereby forming a jointed axle structure having the end sections 14 always held parallel one to the other yet free to move vertically independently of one another so that the driving axle will be similar to and have the advantages of the front axle described in my U. S. Patent No. 1,979,522.

The axle housing end sections 14 each have the anti-friction bearings 24 mounted on the seats 18 and rotatably supporting an inner wheel hub 25 having the customary flange 26 and to which the brake drum 27 and outer wheel hub 28 are bolted or otherwise secured. In the present instance the wheel hub 28 is shown with wire spokes 29 with a "drop center" type rim 30, though it will of course be understood that the type of wheel mounted on the hub is quite immaterial and as in general practice may be wood spoked, disc, or other metal construction.

It will be noted that the inner wheel hub 25 is enclosed by the outer hub 28 and cap 31 and as more particularly shown in Fig. 3 has a universal coupling spider 32, only one arm of which is shown as the same is quite a well known form of coupling and comprises the disc 33 of reinforced fabric or other flexible material bolted or otherwise fastened to the spider arms and to the interspaced arms 34 of a corresponding spider member shown as formed integral with the axle shaft 35 extending through the hollow axle housing end section and splined at the inner end to slideably fit into a correspondingly splined sleeve portion 36 of a universal joint 37 having the mating portion 38 suitably journalled in the gear housing 39.

The gear housing 39 has the flange 40 bolted to the chassis cross member 11 and houses the axle ring gear 41 and differential gears 42 as customary, the ring gear being suitably driven by a power transmission shaft whereby an axle section extending to each side wheel of the vehicle is propelled.

The general advantages of independently sprung wheels are well known and the advantages of mounting the gear housing 39 on the chassis frame of the vehicle so as to reduce the unsprung weight are obvious and in this latter feature the present invention reduces the axle housing structure to the two light frusto-conical tubular end sections and the skeleton parallel yoke bars hingedly connecting them one to the other whereby the end sections and wheels mounted thereon, though free to move independently vertically are at all times maintained in a parallel position, both horizontally and vertically one to the other.

In independent wheel mountings such as herein described where the vehicle wheels are power driven it has been a constant problem to interconnect the centrally arranged driving unit with the wheels and the present invention is more particularly aimed to simplify and better such connections, by materially increasing the possible length of axle drive shafts and the weight of their connections. The increased length will obviously reduce the angle of movement.

As previously described the gear housing 39 secured to the chassis cross member 11 and its contained gearing occupies a minimum conventional space and the axle shafts 35 universally connected therewith extend to the universal couplings which are arranged beyond or "outboard" of the side wheel mountings and the frusto-conical end axle sections on which the wheels are journalled permit adequate angular movement of these shafts when connected as shown to the flexible universal coupling discs 33 which in turn are directly connected to the driving wheel hubs.

It will of course be understood that the wheel bearings may be suitably sealed by dust guards and provided with lubrication means as is well understood in the art, while the coupling made with the discs 33 requires no lubricant and may be arranged at the extreme outer end of the drive wheel hub. It may readily be replaced or the wheel or axle section removed for inspection, repair, or replacement.

Fig. 4 shows the same advantageous arrangement of drive shaft sections and wheel connections using a full lubricated mechanical type of universal joint arranged in the same "outboard" position to give a full length to the shaft section and thus reduce the angularity during operation which is an especially advantageous prerequisite to the successful mechanical operation of a construction such as described, not only because of the lessened angular movement, but the lessened end or axial movement of the correlated parts such as the "slip" joints required in such a construction.

It must be understood that further changes and arrangements of the invention may be made without departing from the essence of the invention, as recited in the annexed claims.

Though the present specification has described the frusto-conical end axle sections 14 hingedly connected one to the other by the parallel links 21 and 22 it is obvious that the advantages of such link connections may be eliminated and a rigid bar connection made between the axle ends making a unitary structure, with all parts held in fixed axial relation, as the axle shaft connections to the drive wheels outside the full floating wheel bearings only require that the frusto-conical end sections be proportioned and arranged to permit sufficient angular movement of the axle shafts as the axle housing moves vertically in relation to the chassis frame.

What I claim as my invention is:

1. In combination, a vehicle frame, a power transmission mechanism having a gear housing carried by the frame, driving wheels, axle shafts operatively connecting said mechanism and wheels, axle sections rotatably connected to the wheels and having rigid inner terminal portions forming the upright sides of a parallel motion mechanism, a pair of members pivotally connecting said portions and completing the parallel motion mechanism, at least one of said members being bowed to straddle said housing and having forked ends each pivoted at spaced points to a terminal portion, and spring means for supporting the frame on said axle sections.

2. In combination, a vehicle frame, driving wheels, axle sections rotatably connected to the wheels and having rigid inner terminal portions forming the upright sides of a parallel motion mechanism, springs supporting the frame on said sections, and a pair of members pivotally connecting said portions and completing the parallel motion mechanism, said members being free of supporting connection with the vehicle frame between said pivotal connections, and one of said members having forked ends pivoted at longitudinally spaced points to each of said terminal portions.

3. In combination, a vehicle frame, driving wheels, axle sections rotatably connected to the wheels and having rigid inner terminal portions forming the upright sides of a parallel motion mechanism, springs supporting the frame on said sections, and a pair of members pivotally connecting said portions and completing the parallel motion mechanism, said members being free of supporting connection with the vehicle frame between said pivotal connections, and both of said members having forked ends pivoted at longitudinally spaced points to each of said terminal portions.

4. In combination, a vehicle frame, a gear housing carried by the frame, gearing within said housing, driving wheels, axle shafts connecting the driving wheels with the gearing, axle sections rotatably connected to the wheels and having rigid inner terminal members forming the upright sides of a parallel motion mechanism, a pair of bars bowed to straddle said housing and completing the parallel motion mechanism, each bar having integral forked ends pivoted at two horizontally spaced points to the terminal member of each axle section, and spring means for supporting said frame on the axle sections.

5. In combination, a vehicle frame, a gear housing carried by the frame, gearing within said housing, driving wheels, axle shafts connecting the driving wheels with the gearing, axle sections rotatably connected to the wheels and having rigid inner terminal members forming the upright sides of a parallel motion mechanism, a pair of bars bowed to straddle said housing and completing the parallel motion mechanism, each bar having integral forked ends pivoted at two horizontally spaced points to the terminal member of each axle section, said gear housing and forked ends being disposed substantially in transverse alignment, and spring means for supporting said frame on the axle sections.

6. In combination, a chassis frame, a driving axle comprising end axle sections supporting said frame, driving wheels rotatably mounted on the axle sections, a power transmission supported by said frame between said axle sections, driving connections between said transmission and said wheels, and a parallel motion mechanism extending between and interconnecting said axle sections, said parallel motion mechanism comprising a pair of spaced superposed horizontal links having their ends pivoted to said axle sections and having their central portions bowed out around the power transmission.

7. In combination, a chassis frame, a driving axle comprising end axle sections supporting said frame, driving wheels rotatably mounted on the axle sections, a power transmission supported by said frame between said axle sections, driving connections between said transmission and said wheels, and a parallel motion mechanism extending between and interconnecting said axle sections, said parallel motion mechanism comprising a pair of spaced superposed horizontal links having their ends secured to said axle sections by horizontal pivots in planes perpendicular to the axes of the axle sections and having their central portions bowed out around the power transmission.

ERLE K. BAKER.